Oct. 12, 1965 S. L. RIDGWAY 3,211,534
EXHAUST CONTROL APPARATUS
Original Filed Oct. 8, 1958

STUART L. RIDGWAY
INVENTOR.

BY Albert Rosen
Morris Spector,
ATTORNEYS

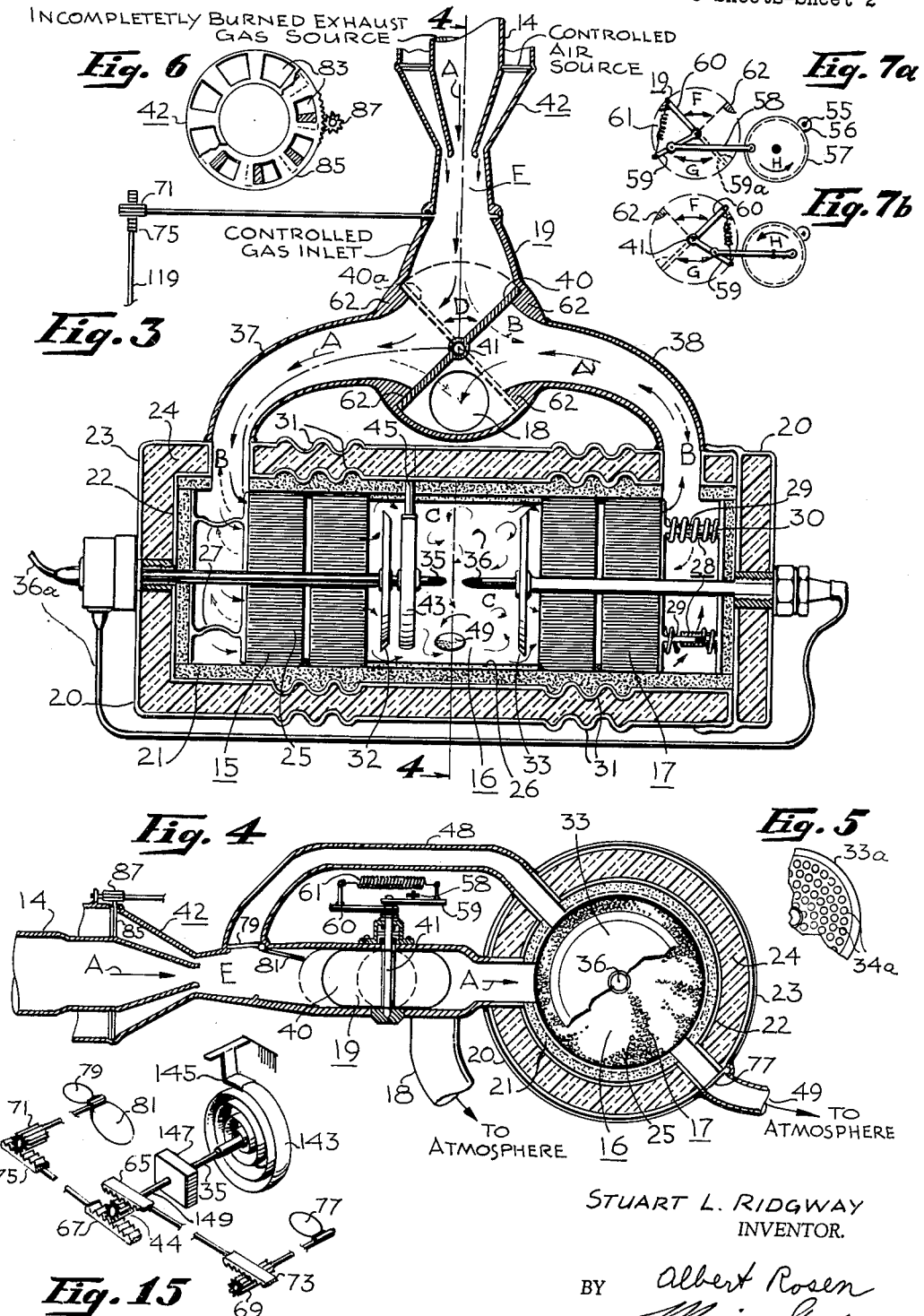

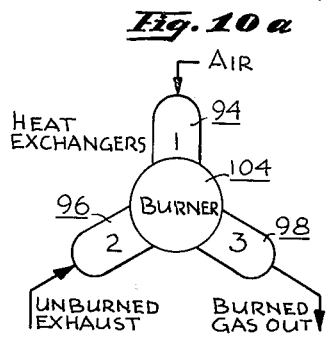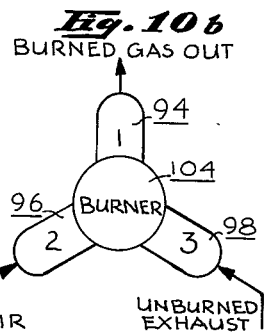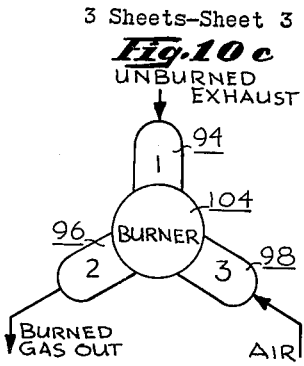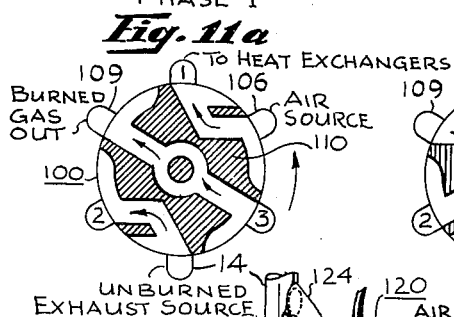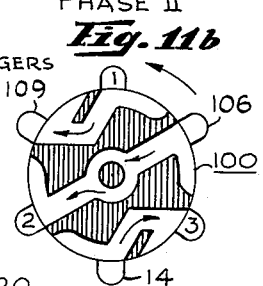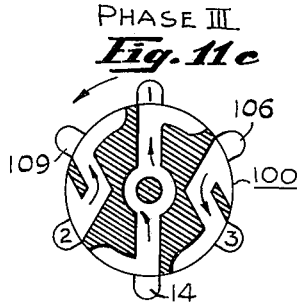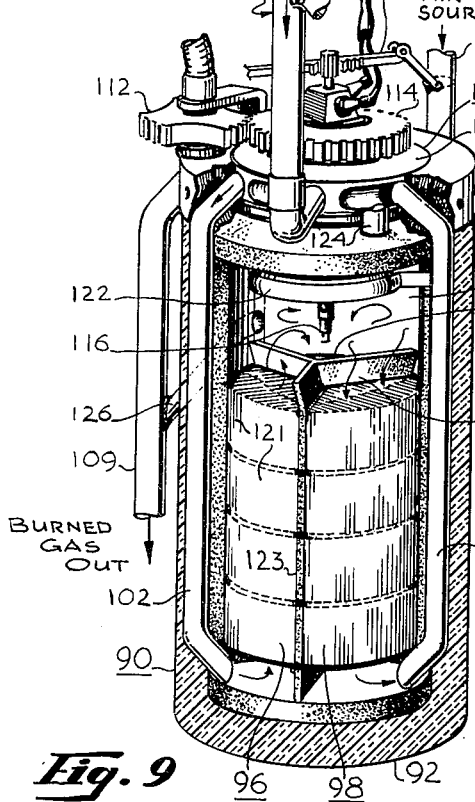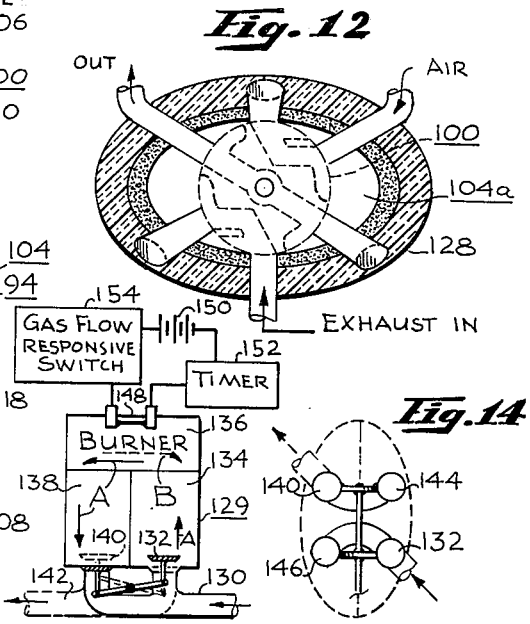

United States Patent Office 3,211,534
Patented Oct. 12, 1965

3,211,534
EXHAUST CONTROL APPARATUS
Stuart L. Ridgway, Torrance, Calif., assignor, by mesne assignments, to TRW Inc., a corporation of Ohio
Continuation of application Ser. No. 765,976, Oct. 8, 1958. This application Dec. 19, 1963, Ser. No. 333,258
20 Claims. (Cl. 23—277)

The present application is a continuation of co-pending application Serial No. 765,976, now abandoned, filed October 8, 1958, and assigned to the same assignee as the present invention. While not limited thereto, the invention is herein described with reference to improvements in the automotive engine exhaust control art. This invention is concerned with an apparatus for removing noxious matter from the exhaust gas of internal combustion engines by burning the residual combustibles therein.

As is known, it is possible to eliminate most of the undesirable constituents of internal combustion engine exhaust gas by mixing the gas with air and burning the mixture. However, if the exhaust gas has a relatively small combustible content, the gas must be heated to relatively high temperatures (usually of the order of about 1400 degrees F.) before combustion can take place. Since the exhaust gas usually contains only a small amount of combustible (for example carbon monoxide, hydrogen, and burned and partially burned hydrocarbons), combustion will not usually be supported at normal exhaust gas temperatures (that is, at temperatures of the order of from about 500 to 1,000 degrees F.).

While various kinds of exhaust gas burner devices have been proposed, they have not proven entirely satisfactory. One of the more important reasons for this appears to be that these previous devices have not satisfactorily accommodated exhaust gas produced over the usual ranges of internal combustion engine operating conditions. For example, during the operation of a conventional automobile there are conditions wherein a mixture of exhaust gas and air will not burn without preheating (e.g., during cruising, during mild acceleration, and sometimes during idling), and other conditions wherein the mixture will burn without preheating but will give rise to temperatures high enough to lead to the destruction of the device (e.g., during deceleration, or in the presence of abnormal operation of the internal combustion engine producing the exhaust gas—during spark plug misfiring). Furthermore, while catalytic burner arrangements have been used to maintain combustion at normal exhaust gas temperatures, the exhaust gas usually also contains catalyst poisoning agents, such as lead compounds, leading to a short catalyst life. Then, too, while still other arrangements are known wherein the gas to be burned is preheated by energy sources other than the exhaust gas itself (for example by the direct addition of gasoline to the gases to be burned), these arrangements have proven undesirable in view of the attendant operating cost.

Accordingly, one of the more important objects of this invention is the provision of an improved and efficient apparatus for substantially completely consuming the combustible components of exhaust gas from an internal combustion engine over the entire operating range of the engine.

Another of the more important objects of the present invention is the provision of an improved means for substantially completely consuming the combustible content of automotive exhaust gas over the entire range of automobile operating conditions, and wherein the means is substantially immune to poisoning and to high temperature destruction over the usual normal and abnormal ranges of engine operation.

The foregoing and related objects are realized in a novel and improved exhaust gas treating apparatus wherein the gas to be treated is first subjected to one heat exchange means to heat the gas prior to combustion, then to combustion to substantially destroy its combustible constituents, and then to another heat exchange means after combustion to extract heat from the burned gas. The direction of gas flow through the two heat exchange means is periodically changed so that successive portions of the gas to be treated are each preheated by passage through the heat exchange means previously traversed by burned gas. The change in direction of gas flow through the heat exchange means is effected at a rate such that the gas to be subjected to combustion is always at a temperature at least high enough to enable the gas to burn.

In one form of the invention, the path of exhaust gas flow is defined by two heat exchanger elements, with a burner chamber connected between these elements, and with the direction of gas flow through the elements periodically reversed. The gas to be treated is first passed in a direction through one exchanger element, through the burner chamber, and then through the other exchanger element; and later the direction of gas flow is reversed so as to flow in a direction through the other exchanger element, through the burner chamber, and finally through the one exchanger element. The reversal in direction of gas flow is effected by a gas direction control switch. The switching rate of this gas direction control switch is adjusted so as to maintain the gas in the burner chamber above a predetermined minimum temperature regardless of the engine operating condition; the switching rate may, for example, be determined by switching rate control means that takes the form of an exhaust gas flow rate measuring device, a gas temperature measuring device, and/or a timing device such as a switch responsive to a predetermined number of internal combustion engine revolutions.

In another form of the invention, the path of gas flow is defined by three heat exchanger elements with a burner chamber connected to intercept gas flow between any two of the elements. In this form of the invention each of the exchanger elements is successively subjected to untreated exhaust gas flowing in one direction, air flowing in the same direction, and treated exhaust gas flowing in the opposite direction, with each of the three exchanger elements performing a different one of these functions at any given time. This succession of gas flow allows great control to be separately exercised over the flow of unburned exhaust gas and over the flow of air; this gas flow succession also assures that if any portion of untreated exhaust gas was not initially directed to the burner chamber, as by reason of its residence in an exchanger element during a switch in gas flow direction, the unburned gas will later be flushed into the burner chamber by the subsequent flow of air through the exchanger element.

The gas treating means of the invention preferably also includes an arrangement adapted to preserve the treating means from developing destructively high temperatures during certain engine operating conditions. In one embodiment of the invention, this arrangement may take the form of a gas bypass connected to shunt the flow of gas around the heat exchange means and directly to and from the region of combustion, with the bypass of gas being effected in response to the detection of conditions leading to relatively high gas combustion temperatures. The detection of high combustion temperatures may be realized either directly, by the detection of a predetermined high gas temperature in the burner chamber, or indirectly, as by the detection of the rate of fuel flow to the engine producing the gas to be treated (for example, by means of the position of an engine throttle).

The invention is described in greater detail in the accompanying three sheets of drawings wherein like reference characters refer to like parts; and wherein:

FIG. 3 is a cut-away side view of exhaust control apparatus according to yet another embodiment of the invention;

FIG. 4 is a partially broken-away sectional view taken through line 4—4 of FIG. 3;

FIG. 5 is a fragmentary view of a portion of a gas flow directing element useful in the apparatus of FIG. 3;

FIG. 6 is a side view of a portion of an air inlet control means of the apparatus of FIG. 3;

FIG. 7a and 7b are illustrations of, respectively, sucessive positions of switch control means useful in the apparatus of FIG. 3;

FIG. 9 is a cut-away perspective view of a portion of the exhaust control apparatus depicted in FIG. 1;

FIGS. 10a through 10c are schematic illustrations of three successive cycles in the operation of the apparatus of FIG. 9;

Figure 2:
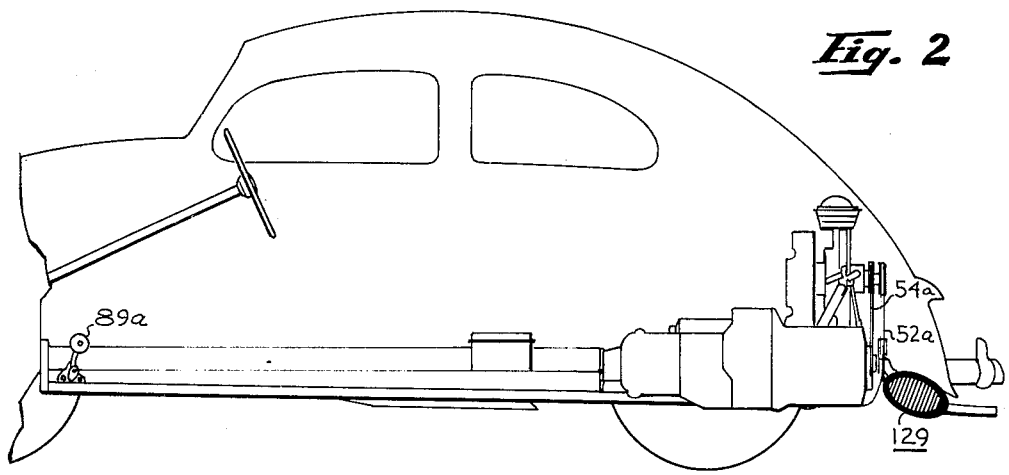
FIG. 2 is a perspective view of a portion of the frame of a typical European automobile utilizing another embodiment of the invention.

FIGS. 11a through 11c are schematic illustrations of three successive orientations of a gas direction control switch used in the apparatus of FIG. 9, the schematic representations of FIGS. 11a through 11c corresponding, respectively, to the switch orientations depicted in schematic illustrations 10a through 10c;

FIG. 12 is a sectional view of exhaust control apparatus of the type illustrated in FIG. 9, but having an elliptical cross section for easier accommodation in a conventional automobile;

FIG. 13 is a broken-away side view of the exhaust control apparatus illustrated in FIG. 2;

FIG. 14 is an illustration of a switching arrangement useful in controlling the direction of gas flow through the apparatus of FIG. 13; and FIG. 15 is a cut-away perspective view of a portion of temperature sensing and control means useful in the apparatus of FIG. 3.

For convenience of explanation, the exhaust control apparatus of the invention is herein described as applied to the elimination of the residual combustible components present in automobile exhaust gas. However, the relatively compact and efficient structural arrangement that can be realized by apparatus embodying the invention allows its accommodation to vehicles of greatly differing sizes, shapes, and operating conditions. In addition, as will be explained in detail below, apparatus embodying the invention can be constructed to effectively treat exhaust gas produced over the range of operating conditions experienced by a relatively large displacement internal combustion engine, exemplified by the illustration in FIG. 1 of an embodiment useful in connection with a 1958 Ford sedan. Apparatus according to the invention can also be arranged to treat exhaust gas produced over the range of operating conditions experienced by a relatively small displacement internal combustion engine, exemplified by the illustration in FIG. 2 of an embodiment useful in connection with a 1955 Volkswagen sedan.

In accordance with the invention, the substantially continuous flow of burned exhaust gas (solid line arrows A in FIG. 3) from a gas source (exhaust pipe 14) is first subjected to preheating in one heat exchange means, a substantially laminar flow heat exchanger 15 so that, when the gas is introduced into a combustion chamber 16, the gas is at a temperature high enough to support the substantially complete combustion of its combustible content. After combustion, the now greatly heated gas is again subjected to heat exchange, in a second heat exchange means (a second substantially laminar flow heat exchanger 17). The gas gives up heat to the second exchanger 17 during its passage through it and then passes through a gas outlet 18 to the atmosphere. The heat extracted by the second exchanger 17 from the substantially completely burned gas is used to preheat a succeeding portion of incompletely burned exhaust gas. During the succeeding flow cycle, the portion of exhaust gas (its path of flow being indicated by dashed line arrows B), is switched, by a gas direction control switch (a butterfly type valve 19) having a vaned member 40 moved from the position 40 (solid lines) to the position 40a indicated by dashed lines to travel a path first through the now heated second heat exchanger 17, then into the combustion chamber 16, and finally through the first-named heat exchanger 15 (heating it) and out to the atmosphere. Thus, in this novel internal combustion engine exhaust afterburner heat exchange arrangement, successive portions of gas to be treated may be considered to be directed in paths temporally adjacent to each other, as distinguished from the more usual heat exchanger arrangement where gases in heat exchange relationship are directed in paths spatially adjacent to each other. That is, a fluid heat exchanger must bring the hot and cooler fluids close to each other for efficient heat transfer, while keeping them physically separate and unmixed. The usual arrangement places the fluids adjacent each other in space at the same time. The present arrangement causes the fluids to pass through the same space at adjacent times. The function of keeping the fluids separate has been transferred from a heat conductive wall spatially separating two fluid streams to a valve system separating in time (temporally) two fluid streams passing a given location. Thus, the heat exchanger portions are spatially spaced apart and the heat transfer fluids are temporary adjacent.

The apparatus of FIG. 3 will now be considered in greater detail. The two heat exchangers 15 and 17 and the combustion chamber 16 are housed within an insulated container 20 in order to minimize heat losses from the apparatus. A minimizing of heat losses is desirable, not only in preventing exposure of the under-carriage of an automobile to excessive heat from the apparatus, but also in maintaining the apparatus at the required elevated operating temperatures. The container 20 (FIGS. 3 and 4) is defined by an inner jacket 21 of insulating material, for example of a bonded ceramic fiber insulating material, enclosed within an outer, supporting jacket. The outer supporting jacket is made up of a pair of spaced-apart sheet metal container portions or members 22 and 23, for example of stainless steel, with the space between the members (which may, for example, be of the order of ½ inch) filled with a yieldable insulating material 24. The double-walled sheet metal assembly formed by the sheet metal members 22 and 23 serves the function of sealing the heat exchangers 15 and 17 and the combustion chamber 16 from direct access to the atmosphere.

According to one feature of the invention, the space between the sheet metal members 22 and 23 is evacuated and the yieldable insulating material 24, preferably in the form of a discontinuous (for example fibrous or powdered) high temperature insulating material such as aluminum silicate, a ceramic fiber, or silica aerogel, is relatively densely packed within the otherwise evacuated space between the metal members 22 and 23 so that the insulating material is in effect snugly seated between these metal members. The space between these sheet metal members 22 and 23 (that is, the space free of insulating material 24) is preferably evacuated to an extent such that the mean free path of residual air or gas molecules in the interstices between adjacent portions of the insulating material 24 is greater than the mean distance between these adjacent insulating material portions. This insulating arrangement offers a number of advantages. For example, this structural arrangement allows the realization of a relatively great amount of effective insulation within the relatively small space available for insulating under conventional, modern automobiles. Then, too, the fibrous or powdered insulating material 24 provides mechanical support between the inner and outer sheet metal members 22 and 23 of the container 20 against the collapsing force of atmospheric pressure so that these members need not be constructed of relatively thick metal stock. Furthermore, not only does the evacuation result in the removal of the effect of the thermal conductivity of the air that would otherwise be present in the space between the sheet metal members 22 and 23, but the insulating material 24 inhibits the transfer of thermal radiation between the metal members 22 and 23 so that a better insulating effect is realized than would be the case if only a vacuum were present in the space defined by these metal members. Finally, the insulating material 24 also provides a means for at least partially absorbing the shock of occasional transient mechanical stresses upon the inner wall of the combustion chamber 16, such as might be induced by an explosion therein; any shock not absorbed by the insulating material 24 would be transmitted from the heat weakened inner metal member 22 to the substantially lower temperature (and therefore mechanically stronger) outer sheet metal member 23.

Each of the heat exchangers 15 and 17 is made up of a cylindrical array of tubular ceramic members 25 having relatively fine cylindrical passageways. The tubular ceramic members 25 serve to provide a heat sink for extracting heat from and delivering heat to gas flowing through the passageways in the tubular members. The tubular passageways defined by the ceramic members 25 direct the gas flow therethrough in substantially laminar flow so as to provide a highly efficient heat transfer relationship between the heat exchanger and the gas flowing through the passageways without providing an appreciable gas pressure drop during the flow of the gas through the exchanger.

One form of heat exchanger constructed in accordance with the invention used tubular ceramic members 25 in the form of commercially available ceramic thermocouple wire insulating members, the insulating members each being .143 inch in diameter and 2 inches in length, and each having four .040 inch diameter longitudinally oriented passageways. Each heat exchanger 15 and 17 was made-up of two longitudinally spaced-apart cylindrical arrays of parallel, tubular ceramic members 25, each cylinder array having a diameter of about 6 inches and a length of about 2 inches, with a space of about ⅛ inch between the two arrays of a heat exchanger. The reason for using two arrays or sections of tubular ceramic members 25 for each heat exchanger, rather than a single section twice as long, is that the shorter members are more resistant to thermal shock stresses than longer members and, in the event of a mechanical breakage of some of the ceramic members, the probability of fracture of two axially aligned ceramic members is relatively small—the latter consideration assures that substantially no opportunity will be provided for gas to effectively partially bypass the entire length of a heat exchanger by passing through a wide channel defined by the support surfaces of member adjacent to or portions of a ruptured ceramic member 25. The tubular ceramic members 25 are bonded to each other, fixing the tubular members in place, by any of the known high temperature ceramic bonding cements. Since the heat exchanger arrangement thus formed has substantially only three regions of change between turbulent and laminar gas flow (namely in the region of gas entrance into the exchanger, in the region of gas passage between the two heat exchanger sections, and in the region of gas exit from the heat exchanger) the gas flow through the heat exchangers described is characterized by relatively infrequent velocity changes. Consequently, a relatively small pressure drop is experienced by the gas during its subjection to heat exchange. The foregoing substantially laminar flow heat exchanger arrangement is to be distinguished from packed bed heat exchangers (for example those made up of substantially tightly packed beds of marble-like elements); such packed bed arrangements are characterized by appreciable gas velocity changes during gas passage between and around the heat exchanger members and, consequently, the gas suffers an appreciable pressure drop during its passage through such an arrangement. While the small pressure drop heat exchangers 15 and 17 of the invention are herein described as being made up of ceramic members 25, it will be appreciated that the relatively infrequent velocity change characteristic of these exchangers may also be used to advantage in subjecting incompletely burned exhaust gas to a catalyst for reducing the burner temperature required to effect combustion of the combustible content of the gas. Thus, for example, the surfaces of the heat exchanger members 25 exposed to gas may be made of any of the known solid combustion catalyst materials. To this end the ceramic heat exchanger members 25 described may be surface coated with the desired catalyst—alternatively, the members 25 may themselves be constructed entirely of the desired catalytic material.

The heat exchangers 15 and 17 are maintained in position within the container 20 by a tubular insulating member 26 (for example, of ceramic) that serves as a spacer member between the heat exchangers 15 and 17 and between the heat exchanger members 25 of each heat exchanger. The region enclosed within this tubular insulating member 26, and lying between the heat exchangers 15 and 17, is defined as the combustion chamber 16. The heat exchangers 15 and 17 are yieldably supported, at their respective ends opposite the combustion chamber 16, by arrays of yieldable metallic elements. The yieldable elements may take the form of bendable sheet metal members 27 and/or spring biased arrangements 28. Each of the spring biased arrangements 28 may take the form of a metallic rod 29 mounted for longitudinal movement and surrounded by a compression spring 30 biased to resiliently support an end of a heat exchanger 17 spaced away from an adjacent end of the container 20. Since the container 20 will experience relatively great dimensional changes during the thousand or more degrees of temperature change to be expected during normal operation in the combustion chamber 16 and the heat exchangers 15 and 17 of the apparatus, the sheet metal walls 22 and 23 of the container are preferably provided with annular corrugated portions 31 to allow for bellows-like expansion and contraction thereof. It should be noted that the temperature gradient across the heat exchangers 15 and 17 is of an order of magnitude that substantially increases the temperature of the incoming gases and substantially decreases the temperature of the exhaust gases. As a result, the yieldable elements 27 and 28 are not subjected to ambient temperatures of more than several hundred degrees despite substantially higher temperatures within the combustion chamber 16.

In order to better direct the flow of gas between the heat exchangers 15 and 17 to and from the combustion chamber 16, gas directing members 32 and 33 are preferably disposed adjacent to the respective inner ends of the heat exchangers 15 and 17 (by inner ends there is meant the heat exchanger ends adjacent to the combustion chamber 16). These gas directing members 32 and 33 may take the form of ceramic disks oriented to initiate turbulent gas flow during the passage of gas from either of the heat exchangers 15 or 17 into the combustion chamber 16. The transition path of gas flow, from its substantially laminar flow in a heat exchanger to turbulent flow within the combustion chamber, is illustrated by arrows C in the drawings. These gas directing members 32 and 33, which are preferably of a ceramic material, also serve as flame holders for better assuring that the gas velocity will not be sufficient under any operating conditions to blow out the flame in the combustion chamber 16.

While the gas directing members 32 and 33 illustrated in FIGS. 3 and 4 are in the form of solid disk-like ceramic members, these gas directing members may instead each take the form of an apertured disk-like member such as the disk 33a illustrated in FIG. 5. The disk 33a defines apertures 34a each having diameters or cross-sectional extents appreciably larger than those of the apertures in the tubular ceramic members 25 (FIGS. 3 and 4) of the adjacent heat exchanger. For example, the disk apertures 34a may each have .25 inch diameters while the ceramic members may each have .040 inch diameters. Consequently, the disk apertures 34a form a set of relatively large diameter jets from the intercepted gas flow between the small diameter jets formed by the end portions of the ceramic members 25 and the central region of the combustion chamber 16. The apertures 34a are preferably spaced apart from each other by a distance such that the solid portions of the gas directing member 33a will provide a recirculation zone to maintain the flame within the combustion chamber 16.

Since, for the gas velocities anticipated, the length of a gas jet in the combustion chamber 16 is from about 10 to 50 times the diameter of the orifice forming the jet, the jets formed by the end portions of the tubular ceramic members 25 would not ordinarily extend appreciably into the combustion chamber (having a longitudinal extent of, for example, 6 inches). However, as indicated above, the larger jets formed by the apertures 34a of the apertured gas directing member 33a may preferably be of the order of about .25 inch in diameter so that each jet of gas extends an appreciable distance into the combustion chamber, assuring extensive mixing of incoming gas with burning gas. If desired, the disk walls defining the apertures 34a may be oriented at an oblique angle to more desirably direct the turbulent gas flow within the combustion chamber 16. One gas directing member that is advantageous in the apparatus described is formed of a ceramic in the shape of a disk of the order of about 5 inches in diameter, about .25 inch thick, spaced about .125 inch from the end portions of the heat exchanger tubular members 25, and has the .25 inch apertures referred to.

In order to initiate combustion within the combustion chamber, a pair of sparking electrodes 35 and 36 (FIG. 3), are disposed within a central region of the combustion chamber 16. With the electrode 36 connected by a shielded wire 36a to some type of high voltage source (not shown), the electrode 35 may be grounded directly to the container 20 or through the shielding of the wire 36a to the automobile frame or engine. For convenience of manufacture, the electrodes may extend axially of the container 20 with the gas directing members 32 and 33 mounted on the electrodes.

Gas normally is fed into and out of the container 20 through a pair of gas directing passageways or conduits 37 and 38. The conduits 37 and 38 channel the gas to the outer end portions of the heat exchangers 15 and 17 to and from the gas direction control switch 19. The gas direction control switch 19 includes a vaned member 40 fixed to a rotatable direction control switch rod 41. The rotational movement of the rod 41, in directions D (FIG. 3), is effective to move the vaned member 40 from the position illustrated in full to the phantom position indicated by the dashed line indication at 40a. The gas direction control switch 19 controls the path of gas flow (that is, in either direction A or B), between the integral exchanger and combustion chamber assembly and the source of incompletely burned exhaust gas to be treated—this gas source comprising, for example, the exhaust pipe 14 from an automobile engine 51 and an air inlet 42 for adding air to the exhaust gas. (As will be explained in connection with FIG. 6, the air inlet may take the form of a venturi type air source 42 having an adjustable opening to provide a controllable volume of air addition.)

As has been described generally in the aforementioned co-pending patent application, and as will be described in greater detail below in connection with FIGS. 8 and 15, a thermostatically actuated control arrangement may be incorporated within the apparatus. This thermostatically controlled arrangement, under the control of a temperature responsive device in the form of a coil 43, may be used, as will be explained below (a) to control the operation of the gas direction control switch 19; (b) to control the bypassing of part or all of the heat transfer capacity of the heat exchangers 15 and 17 (that is, the shunting of untreated gas directly from the gas inlet region E, FIG. 4, through a bypass conduit 48, directly into the combustion chamber 16, and the shunting of treated gas from the combustion chamber 16 to a direct outlet 49 to the atmosphere)—this is desirable when temperatures are detected that are high enough to result in the destruction of the apparatus in the event of continued operation of the heat exchanger portions of the apparatus; and/or (c) to control the venturi type air source 42 in order to regulate the amount of air to be added to unburned gas prior to its treatment in the apparatus of the invention.

Figure 8:
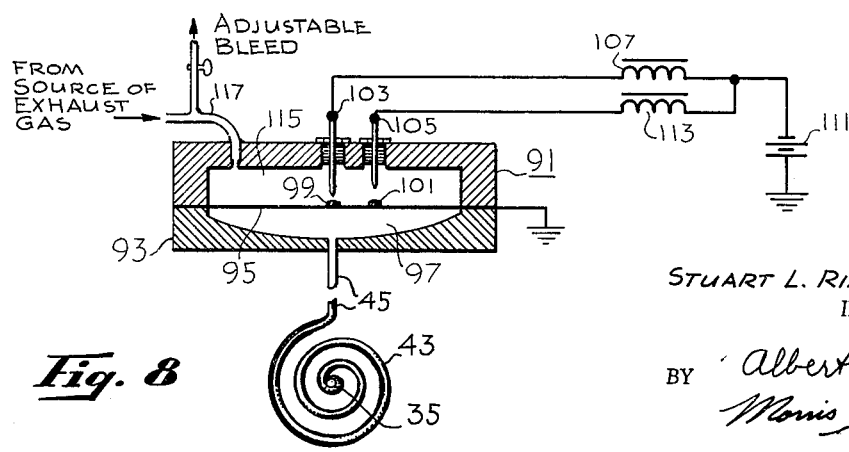
FIG. 8 is a schematic representation of a portion of another embodiment of temperature and gas flow rate sensing and control means useful in the apparatus of FIG. 3.

In one embodiment, the temperature responsive coil 43 of FIGS. 3 and 8 is made of flattened or oval-shaped tubing filled with a gas under pressure and is preferably also mounted on one of the electrodes 35 (or 36). The coil 43 communicates, by means of a tubing connection 45, with a pressure sensitive switch 91 (FIG. 8), which provides an electrical control for realizing the desired control function. The pressure sensitive switch 91 is made up of a support 93 having a flexible diaphragm 95 (for example of sheet brass 1 mil thick) covering a portion of the support so as to define a first chamber 97 therebetween. Two metallic contacts 99 and 101 are fixed to the side of the diaphragm 95 remote from the chamber 97. A pluraltiy of elongated electrodes 103 and 105, one for each of the two contacts 99 and 101, are disposed in spaced-apart adjacency with respect to the contacts 99 and 101 such that an increase in gas pressure in the chamber 97 will cause the diaphram 95, and thus the contacts 99 and 101, to move in a direction towards the electrodes 103 and 105 until, at predetermined chamber pressures, the electrodes will make electric connections with their corresponding electrical contacts. In one embodiment, constructed in accordance with the invention, the maximum excursions of the diaphragm 95, and thus the maximum movement of the contacts 99 and 101, are of the order of .01 inch. The electrodes 103 and 105 are adjustably mounted so that they may make sequential electrical contact with their respective contacts during increasing chamber pressures. When one of the electrodes 103 makes an electrical connection with its contact 99, a circuit is closed energizing a solenoid 107 from a power source, such as an automobile battery 111 for performing a desired control operation. Similarly, at a suitably selected higher chamber pressure, the second electrode 105 is electrically connected to its contact 101 completing a circuit to a second solenoid 113 for desirably actuating a second control function.

The apparatus illustrated in FIG. 8 may also be provided with exhaust gas flow rate responsiveness by allowing a portion of the exhaust gas, as from a pipe 117 that communicates with the source of unburned exhaust gas, to communicate with a second chamber 115, positioned on the opposite side of the diaphragm 95 from the first chamber 97. The pipe 117 is preferably provided with an adjustable bleed to a reference pressure sink (such as the atmosphere) to control the relative amounts of temperature and exhaust gas flow rate response. During conditions of high exhaust gas flow rates, the pressure in the second chamber 115 will be increased by the resultant increase in back pressure on the exhaust gas source. This increase in pressure in the second chamber 115 will oppose the pressure built up in the first chamber 97 in response to the detection of high combustion chamber temperatures so that the pressure sensitive switch 91 will provide actuating impulses in the event of moderately high combustion temperatures accompanied by relatively low gas flow rates, or in the presence of appreciably higher combustion chamber temperatures in the presence of higher gas flow rates. Moreover, it may be desirable to regulate the temperature range of the switch 91 in accordance with the rate of fuel flow whereby the pressure of the pipe 117 may be made to vary in accordance with any change of rate of fuel flow. While the coil 43 has been described as being filled with a gas under pressure for providing a pressure indication of combustion chamber temperature, it will be appreciated that other temperature responsive means may instead be used. For example, as illustrated in FIG. 15, the coil 43 of FIG. 3 may be replaced by a bi-metallic temperature responsive coil 143 (or more properly, by a bi-material coil, since the two materials having different expansion characteristics need not necessarily be metallic), the coil 143 being of the known kind that tends to unwind in the presence of high temperatures. In the use of the latter coil 143, one end 145 of the coil is fixed against movement and the other end of the coil is secured to a supporting electrode 35 (FIGS. 3 and 15). When a bi-metallic coil 143 is used, the supporting electrode 35 is mounted for rotational movement and is connected to any of the known motion and/or power amplifying devices (indicated schematically in FIG. 15 by numeral 147) positioned outside of the container 20. The amplifying device may, for example, be of the general type depicted in FIG. 8. Consequently, rotational motion imparted to the electrode 35 is communicated to a shaft 149 mounting a pinion gear 44. The device of FIG. 15 will be discussed further below.

The gas direction control switch arrangement referred to will now be discussed. Referring now to FIGS. 3, 4, 7a, and 7b, the gas direction control switch 19 is operable to periodically (a) first direct the flow of gas in a direction into one heat exchanger 15, through the combustion chamber 16, and then through the other heat exchanger 17; and (b) later direct the flow of gas in an opposite direction—in a direction into the other heat exchanger 17 and out of the one heat exchanger 15. The periodic reversal in gas flow direction is realized, as indicated above, by having the vaned member 40 successively assume the positions illustrated in FIG. 3 as positions 40 and 40a.

Figure 1:
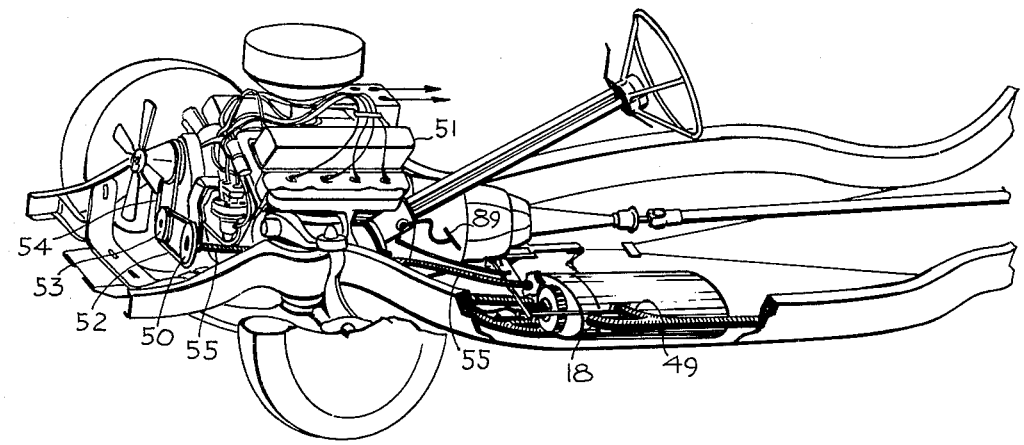
FIG. 1 is a perspective view of a portion of the frame of a conventional American automobile embodying exhaust gas control apparatus of the invention.

While the periodic change in position of the vaned member 40 may be realized in any one of a number of different ways, a preferred way will now be discussed. In order that the loss of untreated exhaust gas directly to the atmosphere be minimized, it is desirable that an appreciable amount of torque be made available to the vaned member during its change in position in order to assure operation of the gas direction control switch quickly. To this end, the switch may be actuated by an over-center spring switch arrangement to be described. The over-center spring switch may be mechanically actuated by means of the internal combustion engine whose exhaust gas is to be treated. For example, as illustrated in FIG. 1, a power take-off pulley 50 may be coupled to the crank shaft (not shown) of an automobile engine 51 by means of a drive belt 52 connected to the same pulley 53 used to provide power to the automobile fan belt 54. The power take-off pulley 50 is connected to a flexible shaft 55. The flexible shaft 55, in turn, is connected to provide the power required to operate the gas direction control switch 19.

As depicted in FIGS. 7a and 7b, illustrations of successive positions of the over-center spring gas direction control switch operating mechanism, the flexible shaft 55 is connected to a speed reduction gearing arrangement, here exemplified by drive and driven gears 56 and 57 respectively. One end of a connecting rod 58 is connected to the driven gear 57 in a manner such that the continuous rotational motion of the driven gear 57 (in direction H) is converted into reciprocating motion of the connecting rod 58. The other end of the connecting rod 58 is connected to a first arm 59, the first arm being mounted on an end of the direction control switch rod 41 (FIG. 4) for free arcuate rotational motion (in direction G) relative to this control switch rod 41. A second arm 60, fixed to the control switch rod 41 for movement therewith (and consequently also connected to the vaned member 40 for movement therewith), is connected to the first arm 59 by means of a tension spring 61; the tension spring 61 is connected to respective end portions of the arms 59 and 60 remote from the control switch rod 41. The second arm 60 is confined to arcuate movements in directions F by stops 62 that limit the travel of the vaned member 40 as well as of the second arm 60.

In operation of the mechanism of FIGS. 7a and 7b, consider first the position illustrated in FIG. 7a. Here the connecting rod 58 is disposed at one extreme limit of its generally rectilinear path of travel, and the first arm 59 describes an acute angle with respect to the second arm 60; the spring 61 is positioned between the end portions of the arms 59 and 60 defining this acute angle. As the driven gear 57 continues its rotational motion in direction H, the connecting rod 58 starts to move in a direction (to the right in FIG. 7a) causing the first arm 59 to move (to the right in FIG. 7a) in one of directions G and define a gradually increasing obtuse angle relative to the second arm 60. As the obtuse angle increases, the tension on the spring 61 also increases. Finally, a position of the connecting rod 58 is reached (the dashed line position 59a illustrated in FIG. 7a) where the obtuse angle referred to, between the two arms 59 and 60, approaches 180 degrees. When this angle exceeds 180 degrees (when the arm 59 assumes the position illustrated in FIG. 7b) the direction of the force exerting tension on the spring 61 causes the spring to pull the second arm 60 into the position illustrated in FIG. 7b. Consequently, the vaned member 40 (FIG. 3), which is connected to the second arm 60, is moved from the position illustrated in full to the position illustrated in phantom. This movement of the vaned member 40 effects the reversal in gas flow referred to.

While the gas direction control switch 19 has been described with reference to actuation by means of an over-center switch arrangement, it will be appreciated that other means may be provided for actuating this gas direction control switch. For example, the switch 19 may be actuated in response to the temperature of the combustion chamber 16. To this end, one of the solenoids 107 or 113 referred to in connection with FIG. 8 may be connected to switch the gas direction control switch 19 to an opposite position every time the temperature of the combustion chamber 16 falls from a satisfactory operating temperature to an appreciably lower temperature.

The by-pass arrangement referred to will now be discussed. FIGS. 3, 4 and 8 illustrate a gas by-pass arrangement for shunting part or all of the untreated exhaust gas directly from the gas inlet region E (FIG. 4) into the combustion chamber 16, and part or all of the treated gas directly from the combustion chamber to a direct outlet 49 to the atmosphere. When the temperature responsive coil 43 (FIGS. 3 and 8) detects combustion chamber temperatures that, in the presence of moderate gas flow rates, are high enough (say over 2000 degrees F.) so that the apparatus may be damaged by the continued presence of these elevated temperatures, the gas pressure in the coil increases to a point where the gas pressure communicated to the first chamber 97 (FIG. 8) causes the first electrode 103 and contact 99 to close the circuit to the first solenoid 107. This solenoid 107 is connected to an arm 119 for imparting rectilinear motion to the arm and to a rack 75 connected to it. This rack movement, in turn, effects rotational movement of a pinion gear 71 for effecting arcuate motion of gas direction control vanes 77, 79, and 81 (FIG. 4).

As illustrated in FIG. 4, the two vanes 79 and 81 may be used to direct the passage of gas from the gas source 14 to the gas direction control apparatus 19 (where the gas is then directed to one or the other of the heat exchangers referred to) during relatively low (such as less than 2000 degrees F.) combustion chamber temperatures, and to direct the gas from the gas source 14 directly into the combustion chamber 16 (via the by-pass conduit 48) during the detection of higher combustion chamber temperatures. As illustrated in FIGS. 4 and 8, the proportion of gas flowing directly into the combustion chamber, by means of the conduit 48, relative to the proportion of gas flowing through the gas direction control apparatus 19 prior to entry into the combustion chamber, may be made a function of the high temperature detected. The sensitivity of the apparatus of FIG. 8 may be arranged so that only the first solenoid 107 is actuated in the presence of moderate gas flow rate and gas temperatures in the range of from about 1600 to about 2000 degrees F., for effecting only a partial opening of the vanes 79 and 81 for shunting only part of the gas directly into the combustion chamber, while both the first and second solenoids 107 and 113 are actuated in the presence of higher temperatures; substantially all of the gas is shunted directly into the combustion chamber 16 under these latter conditions. The by-pass arrangement may also be connected to shunt burned exhaust gas directly from the combustion chamber 16 into the atmosphere upon the detection of the same relatively high temperatures. The latter may be realized by the single gas control vane 77 referred to, this vane 77 controlling the passage of gas from the combustion chamber 16 directly into the outlet 49 to the atmosphere.

The bi-metallic coil 143 arrangement depicted in FIG. 15 may also be to effect the gas by-pass described. When the coil 143 in this arrangement is exposed to predetermined elevated temperatures it effects rotational movement of its supporting electrode 35. This movement usually is amplified and effects rotation of a pinion gear 44. Rotation of this pinion gear 44 gives rise to rectilinear movement of two racks 65 and 67; this rack movement, in turn, effect rectilinear movement of, respectively, racks 73 and racks 75 connected thereto. The foregoing gives rise to rotational motion of pinion gears 69 and 71, which in turn, effect arcuate motion of the gas direction control vanes 77, 79, and 81.

The amount of air to be added to the unburned exhaust gas prior to combustion may be controlled by the adjustable venturi type air source 42 illustrated in FIGS. 4 and 6. To this end, the openings 83 of the air source 42 to the atmosphere may be partially shut by a rotatable shutter 85 connected to be controlled in rotation by a pinion gear 87. The pinion gear 87 may be controlled, in turn, in response to the position of the throttle 89 (FIG. 1) of the automobile in which the apparatus is used. The connection between the pinion gear 87 and the throttle 89 may be made by any of the known mechanical or servo linkages. Alternatively, the setting of the rotatable shutter 85 may instead be controlled by the quantity and/or velocity of the exhaust gas to be treated. To this end, the pinion gear 87 may be controlled in its rotatable position by a vane-like member (not shown) interposed in the stream of exhaust gas so that the pressure of the gas on the vane controls the position of the vane. The vane, in turn, controls the position of the pinion gear 87 by any of the known mechanical linkages. While a single venturi type air addition arrangement 42 has been shown by way of example, it will be appreciated that a plurality of two or more such arrangements may instead be used, with the arrangements connected in parallel. In such a case the air addition arrangements may be connected so that a number of them are operative during high exhaust gas flow rates and only one is operative during appreciably lower flow rate. This allows the apparatus of the invention to more easily accommodate a wide range of exhaust gas flow rates.

FIG. 9 illustrates apparatus according to another embodiment of the invention. In this embodiment, unburned exhaust gas and the air with which it is to be mixed in order to effect combustion are separately subjected to heat exchange prior to subjecting the gas to combustion. The apparatus 90 comprises an insulating container 92 (which may be of an integral insulating material or, preferably, may be of the type of container construction illustrated in FIG. 3) within which heat exchange means is housed in the form of three separate, adjacent heat exchanger sections 94, 96, and 98, each constructed of a plurality of generally flat ceramic members 121 spaced apart from each other by integral ceramic ribs (not shown) for creating gas flow passages between longitudinally adjacent members 121. As will be explained in connection with FIGS. 10a through 11c, each of the heat exchanger sections 94, 96, and 98 are successively subjected to unburned exhaust gas (for heating this exhaust gas prior to combustion), air (for heating the air prior to combustion of the exhaust gas with which it is to be mixed), and burned exhaust gas (for extracting heat from the burned exhaust gas). Gas from the unburned exhaust gas source 14 is subjected to a gas direction control switch 100 as it is fed into and through the first heat exchanger section 94 and into the combustion chamber 104. At the same time, air from an air source 106 is fed into a conduit 102 and then into and through the section heat exchanger sections 96 and into the combustion chamber 104 where it mixes with the unburned exhaust gas for supporting combustion. After combustion the burned exhaust gas flows from the combustion chamber 104 into and through the third heat exchanger section 98 and into another conduit 108, back through the gas direction control switch 100, and finally out of an exhaust gas conduit 109 to the atmosphere.

The flow of air, unburned exhaust gas, and burned exhaust gas described is schematically depicted in FIG. 10a as Phase I. The position of the gas direction control switch 100 during the Phase I illustrated in FIG.10a is indicated schematically in FIG. 11a. For convenience of description, the heat exchanger sections 94, 96, and 98 are also depicted by the numerals 1, 2, and 3. After a predetermined length of time, the gas direction control switch 100 switches the direction of gas flow to that designated in FIGS. 10b and 11b as Phase II. In Phase II (corresponding to the flow paths discussed in the preceding paragraph), air passes through the second heat exchanger 96 prior to its entry into the burner or combustion chamber 104 (and thus sweeps into the combustion chamber any residual unburned exhaust gas that may have had residence in the second heat exchanger section 96 during the switching operation). Unburned exhaust gas now passes into the combustion chamber 104 via the third heat exchanger section 98 previously used to pass burner gas out to the atmosphere, and burned gas is now passed from the combustion chamber 104 through the first heat exchanger section 94 (previously admitting fresh air) and out to the atmosphere. Similarly, in Phase III, schematically illustrated in FIGS. 10c and 11c, the air passes through the third heat exchanger section 98, unburned exhaust gas passes through the first heat exchanger section 94, and the burned gas passes into the atmosphere through the second heat exchanger section 96. The switching through the successive phases is realized by counter-clockwise motion (in FIGS. 10a to 11c), of the gas control member 110 of the gas control switch 100.

The intermittent operation of the gas direction control switch 100 is indicated schematically in FIG. 9 as being controlled by a Geneva gear 112 mounted to intermittently effect rotational movement of a drive gear 114 fixed to the gas control member 110. The Geneva gear 112 may be controlled in rotation by means of a flexible shaft similar to the flexible shaft control arrangement illustrated in FIG. 1 with respect to the embodiment illustrated in FIG. 3. As is the case in the apparatus described with respect to FIG. 3, the combustion chamber or burner 104 is provided with ignition means 116, which may here be in the form of a spark plug. The flow of gas from the heat exchanger sections 94, 96, and 98 into the combustion chamber 104 be directed by means of suitably positioned and oriented gas direction control means—here depicted in the form of a tri-vaned gas directing element 118; the amount of air flowing into the apparatus may be controlled by a mechanical linkage 120 connected to be responsive to the throttle of the automobile with which the apparatus is to be used; and the temperature of the apparatus may be controlled by a temperature responsive coil 122 of the type (43 or 143) explained above with respect to FIGS. 3, 4, 8 and 15, connected to control the bypassing of gas around the heat exchanger sections directly into and out of the combustion chamber 104 (by means of, respectively, conduits 124 and 126).

While each of the heat exchanger sections 94, 96, and 98 is illustrated in the apparatus of FIG. 9 as being supported by support members 123 that insulate each of the exchanger sections from the others, it is to be realized that the support members 123 may instead be constructed (as by having relatively large thermal apertures in portions of each member between adjacent heat exchanger sections) so that radiant heat may be transferred from each of the heat exchanger sections to the others. In this arrangement the heat exchanger section being cooled by incoming air or exhaust gas receives radiant heat directly from the exchanger section being heated by exiting burned exhaust gas so that the exchanger sections subjected to incoming air and exhaust gas are cooled at relatively slow rates. In order to even further increase the radiative heat transfer between heat exchanger sections, the sections may each be formed in a shape having a relatively large surface area exposed to the other sections so that a maximum radiative heat transfer is realized.

FIG. 12 illustrates a modification of the apparatus of FIG. 9 in which the gas control apparatus is provided with an elliptical cross-sectional area for easier accommodation in a vehicle having a relatively narrow space for the accommodation of the apparatus. As illustrated in FIG. 12, the gas direction control switch 100 may be the same as the one described in FIG. 9, while the three heat exchanger sections collectively have an elliptical contour. In this case the combustion chamber 104a and the container 128 of the apparatus, too, have elliptical cross-sections. The operation of the apparatus of FIG. 12 is substantially the same as that described with respect to the apparatus of FIG. 9.

FIGS. 13 and 14 illustrate unburned exhaust gas treating apparatus according to another embodiment of the invention. In this embodiment the apparatus 129 is provided with a relatively compact form and is especially suited for use in automobiles, such as for example, the one illustrated in FIG. 2, having relatively small space accommodations. In the apparatus indicated schematically in FIGS. 13 and 14, a mixture of exhaust gas and air flows from a source thereof into a gas inlet 130 through a first valve 132, through a first heat exchanger section 134, and then into a burner or combustion chamber 136 where combustion is effected. After passing through the combustion chamber 136, the burned gas passes through a second heat exchanger section 138, where the gas gives up heat to the heat exchanger section, and then passes through a second valve 140, illustrated in phantom in FIG. 13, and finally through a conduit 142 to the atmosphere. The described direction of gas flow is indicated in FIG. 13 by arrows A. After a predetermined interval of time, a gas direction control switch (not shown), which may be a modification of one of the types described above, causes the two open valves described 132 and 140 to close, and opens two previously closed valves 144 and 146. The gas control switch may, for example, be powered by an over-center spring arrangement of a type generally similar to the one described in connection with FIGS. 3, 4, 7a and 7b; in this case the fanbelt 54a of FIG. 2 may be used to power a power take-off belt 52a for providing the switching power. The direction of gas flow through the apparatus in its switched position is now in an opposite direction (illustrated by dashed-line arrow B) first passing into the second heat exchanger section 138, then through the burner or combustion chamber 136, and finally through the first heat exchanger section 134 and out to the atmosphere through the conduit 142. As was described above in connection with FIGS. 3, 4 and 6, the amount of air added to the exhaust gas prior to its passage through the heat exchanger and combustion means may be controlled in response to the exhaust gas flow rate, the latter being a function of the position of the throttle 89a of the automobile.

The combustion in the combustion chamber 136 is here illustrated as being initiated by means of an incandescent filament 148 connected to be energized by the battery 150 present in the automobile in which the apparatus 129 is used. In order to assure that the gases present in the combustion chamber 136 are not immediately subjected to ignition when the automobile in which the apparatus is used is started (to avoid the possibility of an explosion in the combustion chamber 136 in the presence of an explosive mixture of gases therein), the incandescent filament 148 may be made of a material which does not reach gas ignition temperature until a short period of time after it is energized, or a timer 152 may be connected in series with the filament 148 in order to assure that the filament is not energized until a predetermined period of time after the automobile engine with which it is to be used is energized. In the latter case, the filament would be connected to be energized at the same time that the automobile ignition system is energized, with the timer 152 serving to delay actual energization of the filament until after the desired time delay. If desired, the filament may instead be connected to be energized only from the generator (not shown) of the automobile with which the apparatus is to be used, so that the filament will not initiate combustion until after the automobile engine has picked up enough speed to allow the generator to provide the required filament operating voltage. Alternatively, the apparatus may be provided with a gas flow responsive switch 154 connected in series between the filament 148 and the battery 150 for delaying the energization of the filament until after the detection of an appreciable flow of exhaust gas (indicating that any potentially explosive gas mixture in the combustion chamber 136 has been flushed therefrom). In the latter case, the gas flow responsive switch 154 may take the form of any of the known microswitches connected to be actuated by movement of a vane positioned to be moved by the flow of exhaust gas against the vane.

The ignition relay referred to may be realized by other means. For example, an oxidation catalyst (not shown) may be disposed within the combustion chamber, with the catalyst being of a type that will rise in temperature upon being subjected to the exhaust gas stream. The heating of the catalyst is effected by oxidization of a portion of the combustion content of the gas stream. Since the catalyst has an appreciable thermal time constant, the engine must be in operation for at least several seconds until ignition of the gas is effected by the catalyst.

In order to prevent deterioration of this catalyst due to lead poisoning by the lead salts usually accompanying the exhaust gas, temperature responsive means (such as a thermostatically controlled solenoid valve or a bimetallic strip) may be used to displace the oxidation catalyst ignitor from the combustion chamber upon the realization of a flame temperature within the combustion chamber.

While the apparatus of the invention has been described as applied to an exhaust gas afterburner and heat exchanger arrangement operative without the use of combustion catalyst means, it is to be realized that combustion catalysts may also be used in combination with the afterburner and heat exchanger arrangements described. For example, in order to avoid catalyst poisoning due to continued exposure of a catalytic material to exhaust gas during operation of an exhaust gas control apparatus a dispersed catalyst may be used for continually supplying new catalytic material to the combustion chamber during operation of the apparatus. By a dispersed catalyst there is meant a catalyst that is dispersed in a finely divided state in the exhaust gas. The use of a dispersed catalyst may be accomplished, for example, by adding to the internal combustion engine fuel a fuel soluble compound of the type that forms a combustion catalyst of the kind referred to during operation of the engine. Since it is known that copper and vanadium oxides act as combustion catalysts, gasoline soluble copper or vanadium compounds may be added to the gasoline, the compounds being of a type that reduce to, respectively, a copper oxide or vanadium pentoxide after subjection to internal combustion engine operation. Some of the compounds that may be used for this purpose are indicated in the "Handbook of Chemistry and Physics," 38th edition, published by Chemical Rubber Publishing Company, Cleveland, Ohio, at, for example, page 516 where it is seen that a copper salt of oleic, palmitic, or stearic acids may be used for this purpose. During the use of a copper palmitate, $Cu(C_{16}H_{31}O_2)_2$, gasoline additive, for example, this compound breaks down into copper oxide and normal combustion by products during normal combustion of the gasoline. Consequently, the exhaust gas produced by fuel containing copper palmitate contains dispersed copper oxide which will act as a combustion catalyst during the exhaust gas afterburning treatment described. In addition to these inorganic copper salts (that is, copper oleate, copper palmitate, and copper stearate) a metal-organic compound such as copper diazoaminobenzene (discussed on pages 638 and 639 of the handbook referred to) may instead be used.

The fuel soluble catalyst forming compound is preferably one that exhibits a volatility such that it will volatilize at temperatures common in the intake manifold of the engine, for example at temperatures of about 400 degrees F., in order to operate best in conventional carburetor type automobile engines. While gasoline soluble catalyst forming compounds that volatilize at appreciably higher temperatures may be used in a carburetion type fuel supply system, this use of such compounds is not preferred since a portion of the compound may not volatilize so that some of the compound may tend to remain in the manifold. However, since no fuel vaporization arrangements are used in a fuel injection system prior to injection of the fuel into the engine, a fuel injection arrangement is adapted to accommodate higher temperature catalyst forming materials than volatilization carburetion type systems.

While the dispersed catalyst has been described with reference to a fuel soluble material, it is realized that the catalyst may instead be added to a stream of exhaust gas by spraying the catalyst into the stream or by creating finely divided catalytic particles by an arc created between two solid materials disposed within the stream of exhaust gas.

Each of the foregoing exhaust gas treating arrangements has been described with respect to normal automobile engine operation. It is to be appreciated, however, that if the normal engine starting operation does not provide the exhaust gas with sufficient chemical energy to enable the exhaust gas treating arrangement of the invention to initiate combustion within a desired short period of time after the starting of the engine, means (such as the temperature sensing means of FIGS. 8 and 15, but positioned to sense the temperatures of the heat exchanger sections instead of the temperature of the combustion chamber) may be connected to control the richness of the fuel mixture fed to the engine (as by a connection operating the choke normally present in the automobile). The fuel mixture would be maintained at a richness sufficient to provide the necessary chemical energy to maintain the combustion process in the exhaust gas combustion chamber. When an adequate amount of heat has been stored in the heat exchanger sections to maintain the exhaust gas combustion at normal fuel richness settings, the engine is allowed to revert to normal operation. An analogous arrangement may be used in exhaust gas combustion arrangements of the type wherein a combustion catalyst is used, and wherein the combustion catalyst is of the kind that must be heated to above a predetermined temperature in order for the catalyst to become operative. The increased fuel richness would be maintained until the catalyst has been heated to a temperature sufficient to catalyze the exhaust gas combustion. In order to better heat the catalyst to operating temperature, the catalyst may be preceded, in position along the exhaust gas flow, by an initial or preburner chamber having a spark plug or other ignition means; the rich starting mixture would result in the directing of a hot (1400 degrees F. or higher) gas stream directly onto the catalyst shortly after the start of engine operation. The last-named arrangement may also be used in protecting the catalyst from damagingly high temperatures (as may occur under circumstances such as automobile deceleration, when the catalyst may be subjected to a rich exhaust gas mixture). After the catalyst has been heated to operating temperature, the preburner chamber can be used to burn overly rich exhaust gas mixtures, with the catalyst being partially by-passed during the burning of these overly rich mixtures; alternatively, the burned overly rich mixtures may be fed to the catalyst through an auxiliary route exposed to appreciable heat loss to the atmosphere. The last-named arrangements would be switched into operation only after the catalyst has been heated to the desired catalyst operating temperature.

As has been indicated, apparatus constructed in accordance with the invention is adapted to satisfactorily accommodate internal combustion engine exhaust gas produced over the entire usual ranges of engine operating conditions and to substantially completely consume the unburned combustible components of the gas by the use of substantially only the enthalpy (that is, the chemical and thermal energy) contained therein. Upon reflection it is clear that the apparatus of the invention replaces the conventional muffler. The chart below illustrates representative operating conditions during normal operation of an automobile of the type illustrated in FIG. 1. As indicated in the last column of the chart, appreciable amounts of heat exchange are required during cruise conditions. The method and apparatus of the invention, exemplified for example by the apparatus in FIG. 3, is adapted to accommodate these operating conditions. The apparatus is also adapted to accommodate (by means, for example, of the bypass arrangements referred to) the automobile operating conditions encountered during very rapid deceleration and during conditions of automobile engine spark plug misfiring.

*Chart illustrating various operating conditions for a typical American automobile having a 280 cubic inch displacement internal combustion engine*

| | Approx. exhaust gas temp. about 10 ft. along the exhaust pipe from the exhaust manifold | Approx. exhaust gas flow rate in s.c.f.m.[1] | Relative chemical energy content of a given quantity of exhaust gas [2] | Relative amount of required exhaust gas bypass (around a heat exchanger) | Relative amount of heat exchange required for combustion |
|---|---|---|---|---|---|
| Idling | 400 deg. F | 10 | 2,000 deg. F | Small | Small. |
| Slow acceleration from 30 m.p.h. to 40 m.p.h. (carburetor power jet closed). | 650 deg. F | 45 | 500 deg. F | None | Moderate. |
| Maximum acceleration from 40 to 60 m.p.h. (carburetor power jet open). | 1,000 deg. F | 120 | 1,000 deg. F | Moderate | Do. |
| Cruise, 30 m.p.h. (power jet closed) | 600 deg. F | 30 | 500 deg. F | None | Appreciable. |
| Cruise, 60 m.p.h. (power jet closed) | 900 deg. F | 70 | 500 deg. F | None | Do. |
| Very rapid deceleration | 500 deg. F | 10 | 3,000 deg. F | Appreciable | None. |
| Any of above during spark plug misfiring | | | Up to 3,000 deg. F | do | None. |

[1] Standard cubic feet per minute—The equivalent cubic feet per minute at normal atmospheric temperature (70 deg. F.) and pressure (1 atmosphere).

[2] As measured by the theoretical temperature rise produced by complete combustion of all of the combustible material in the exhaust gas, the combustible material being primarily unburned and partially burned hydrocarbons, carbon monoxide, and molecular hydrogen ($H_2$).

From the foregoing, it is realized that the method and apparatus of the invention provides improved arrangements for substantially completely consuming the combustible components of exhaust gas from an internal combustion engine over the entire operating range of the engine.

The embodiments of the invention in which an exclusive property or privilege is claimed are defined as follows:

1. Self-sustained unburned exhaust gas control apparatus, comprising:

gas inlet means connected to receive unburned exhaust gas and air for mixing said exhaust gas and said air;

burned exhaust gas outlet means;

a single exhaust gas burner having portions defining two gas transfer passages;

two substantially laminar flow heat exchange members each constructed to preserve gas flowing therethrough from frequent gas flow acceleration and each connected to one of said gas transfer passages, with said burner serially connected intermediate said members; and switching means connected periodically first and substantially simultaneously to couple one of said members to said gas inlet mens and the other of said members to said gas outlet means, and then substantially simultaneously couple said other of said members to said gas inlet means and said one of said members to said gas outlet means.

2. The apparatus defined by claim 1, wherein each of said heat exchanger members comprises a ceramic member defining a plurality of adjacent, substantially uniformly tubular passageways each adapted to subject gas flow to substantially laminar flow therethrough.

3. The apparatus defined by claim 1, including means for sensing temperature of said exhaust gas burner for controlling said switching means in response thereto.

4. The apparatus defined by claim 1, including by-pass means selectively operable to pass unburned exhaust gas and air directly into said exhaust gas burner.

5. The apparatus defined by claim 1, including by-pass means selectively operable to pass burned exhaust gas directly to atmosphere from said exhaust gas burner.

6. The apparatus defined by claim 1, including by-pass means selectively operable to pass unburned exhaust gas and air directly into said exhaust gas burner and to pass burned exhaust gas directly to atmosphere from said exhaust gas burner.

7. The apparatus defined by claim 1, including by-pass means selectively operable to pass unburned exhaust gas and air directly into said exhaust gas burner; and means for sensing temperature of said exhaust gas burner for selectively operating said by-pass means in response thereto.

8. The apparatus defined by claim 1, including by-pass means selectively operable to pass burned exhaust gas directly to atmosphere from said exhaust gas burner; and means for sensing temperature of said exhaust gas burner for selectively operating said by-pass means in response thereto.

9. The apparatus defined by claim 1, including by-pass means selectively operable to pass unburned exhaust gas and air directly into said exhaust gas burner and to pass burned exhaust gas directly to atmosphere from said exhaust gas burner; and means for sensing temperature of said exhaust gas burner for selectively operating said by-pass means in response thereto.

10. The apparatus defined by claim 1, including means responsive to the amount of unburned exhaust gas to be burned for controlling the amount of air mixed therewith.

11. Self-sustained apparatus for treating incompletely burned internal combustion engine exhaust gas from a source thereof to minimize its combustible content, comprising:

an internal combustion engine exhaust gas source;

gas inlet means connected to receive unburned exhaust gas from said source;

air inlet means connected to said apparatus to supply air to said unburned exhaust gas;

gas outlet means connected to discharge treated exhaust gas from said apparatus;

at least three independent substantially laminar flow heat exchanger portions being connected for gas flow therebetween and each being selectively connectable to said gas inlet, gas outlet and air inlet means;

an exhaust gas burner connected to said exchanger portions for intercepting the gas flow therebetween, with said burner having a gas directing means to direct gas transfer between different exchanger portions through said burner; and switching means for connecting one of said heat exchanger portions to said gas inlet means while connecting another of said heat exchanger portions to said gas outlet means, and the third of said heat exchanger portions to said air inlet means and later connecting said another of said exchanger portions to said gas inlet means, while connecting said one of said heat exchanger portions to said air inlet means and said third heat exchanger portion to said gas outlet means.

12. The apparatus defined by claim 11, including means for sensing temperature of said exhaust gas burner for controlling said switching means in response thereto.

13. The apparatus defined by claim 11, including by-pass means selectively operable to pass unburned exhaust gas and air directly into said exhaust gas burner and to pass burned exhaust gas directly to atmosphere from said exhaust gas burner.

14. The apparatus defined by claim 11, including by-pass means selectively operable to pass unburned exhaust gas and air directly into said exhaust gas burner and to pass burned exhaust gas directly to atmosphere from said exhaust gas burner; and means for sensing temperature of said exhaust gas burner for selectively operating said by-pass means in response thereto.

15. The apparatus defined by claim 11, including means responsive to the amount of unburned exhaust gas to be burned for controlling the amount of air mixed therewith.

16. An apparatus for treating a substantially continuous flow of incompletely burned internal combustion engine exhaust gas to minimize the unburned combustible content thereof, comprising:
   means for adding air to said exhaust gas valve means connected to receive said air and exhaust gas for continually directing successive portions of the substantially continuous flow of gases to be treated in different paths of travel;
   a first laminar flow heat exchanger means;
   a second laminar flow heat exchanger means, said first exchanger means and said second exchanger means being spaced apart;
   container means positioned adjacent to one end of both said first exchanger means and said second exchanger means for enclosing a space to form a single combustion chamber therebetween;
   means in said combustion chamber for creating turbulent flow of gases flowing therein;
   and switching means for selectively operating said valve means to direct a first portion of the substantially continuous flow of gases to be treated through said first exchanger means to said combustion chamber for self-sustained combustion therein and through said second exchanger means for heating said second exchanger means in accordance with enthalpy contained within said first portion, and to direct a successive portion through said exchanger means to be heated thereby.

17. The apparatus defined by claim 16, including means for sensing temperature of said exhaust gas burner for controlling said switching means in response thereto.

18. The apparatus defined by claim 16, including by-pass means selectively operable to pass unburned exhaust gas and air directly into said combustion chamber and to pass burned exhaust gas directly to atmosphere from said combustion chamber.

19. The apparatus defined by claim 18, further including
   means for sensing temperature of said exhaust gas burner for selectively operating said by-pass means in response thereto.

20. Self-sustaining incompletely burned exhaust gas control apparatus comprising:
   gas inlet means connected to receive unburned exhaust and air for mixing said exhaust gas and said air;
   burned exhaust gas outlet means;
   a single exhaust gas burner having portions defining two gas transfer passages;
   two laminar flow heat exchanger members each fixed in position and connected to one of said gas transfer passages, with said burner being serially connected intermediate said members;
   switching means connected periodically first and substantially simultaneously to couple one of said members to said gas inlet means and the other of said members to said gas outlet means, and then substantially simultaneously couple said other of said members to said gas inlet means and said one of said members to said gas outlet means and;
   container means housing said burner and said exchanger members and having a plurality of gas communicating channels each communicating with the interior of said container means;
   said container means including a first sheet metal container portion surrounding said burner and said exchanger members and accommodating said gas communicating channels for access to said burner and said exchanger members and a second sheet metal container portion spaced apart from, and substantially completely surrounding said first sheet metal portion,
   the space defined between said first and second sheet metal container portions and said channels being partially filled with a yieldable insulating material stable up to temperatures at least as high as that of the highest normal operating temperatures of said apparatus, with the portions of said space free of said insulating material being substantially evacuated,
   said insulating material being positioned to provide mechanical support for said first sheet metal portion by said second sheet metal portion during the subjection of said first metal portion to combustion originated transient mechanical shock under conditions of heat weakening first sheet metal container portion temperatures, while preserving said second sheet metal portion from heat weakening combustion temperatures for enabling said second portion to preserve said first portion from rupture by said shock, whereby said insulating material inhibits thermal radiation from said first portion to said second portion while minimizing thermal conduction between said first and second portions for improved operation of said exhaust gas control apparatus.

References Cited by the Examiner
UNITED STATES PATENTS

| | | | |
|---|---|---|---|
| 1,939,153 | 12/33 | Villasuso | 165—5 |
| 2,658,742 | 11/53 | Suter et al. | |
| 2,674,521 | 4/54 | Houdry. | |
| 2,898,202 | 8/59 | Houdry et al. | |
| 2,937,490 | 5/60 | Calvert | |

MORRIS O. WOLK, *Primary Examiner.*